United States Patent [19]
Cluff et al.

[11] Patent Number: 5,962,930
[45] Date of Patent: *Oct. 5, 1999

[54] METHOD AND APPARATUS FOR DETECTING SUPPLY POWER LOSS

[75] Inventors: Dean K. Cluff, Beaverton, Oreg.; Loc Van Doan, Vancouver, Wash.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/979,583

[22] Filed: Nov. 26, 1997

[51] Int. Cl.⁶ .......................................................... H02J 7/00
[52] U.S. Cl. ........................... 307/66; 307/64; 364/528.3; 364/528.28; 365/229
[58] Field of Search ..................... 307/64, 66; 364/492, 364/273, 273.1, 273.2, 273.4, 273.5; 365/229

[56] References Cited

U.S. PATENT DOCUMENTS

| | | | |
|---|---|---|---|
| 4,638,175 | 1/1987 | Bradford et al. | 307/64 |
| 4,675,538 | 6/1987 | Epstein | 307/66 |
| 4,779,007 | 10/1988 | Schlanger et al. | 307/66 |
| 5,019,717 | 5/1991 | McCurry et al. | 307/66 |
| 5,519,261 | 5/1996 | Stewart | 307/66 |

*Primary Examiner*—Albert W. Paladini
*Attorney, Agent, or Firm*—Blakely, Sokoloff, Taylor & Zafman

[57] ABSTRACT

A microprocessor system includes a microprocessor and a first controller. The first controller is coupled to the microprocessor, and the first controller includes a first memory adapted to store a power loss indicator. A method for detecting a reduction of a power supply voltage in a microprocessor system includes coupling the power supply voltage to a first memory of a controller. A power loss indicator is stored in the first memory. The occurrence of a predetermined event is detected, and the first memory is read in response to the predetermined event to determine if the power loss indicator is intact.

20 Claims, 3 Drawing Sheets

METHOD AND APPARATUS FOR DETECTING SUPPLY POWER LOSS

BACKGROUND OF THE INVENTION

1. Field of the Invention

The present invention relates to the field of computer systems. More specifically, the present invention relates to the art of detecting power supply loss in a microprocessor system.

2. Description of the Related Art

Digital systems are sensitive to power supply perturbations. Power outages or momentary losses of power (i e., voltage brownouts) can cause microprocessor systems, such as computers, to reset (i.e., reboot). There are typically other reasons for resetting a microprocessor system. For example, the user might reboot the system by pressing a predetermined key combination on the keyboard (soft reboot), or by pressing a reset switch (hard reboot). Also, certain software applications may reset the computer due to changes made in the operating environment that require the system to be reset prior to becoming effective.

When the system reboots, the user might want the computer to operate differently depending on the reason for the reboot. For example, if the user were to be away from the computer and power was lost, they might want the computer to remain off. On the other hand, if the reboot was caused intentionally by a software application, the user would desire that the computer would restart.

To ensure proper operation following a power loss event, microprocessor systems typically include power loss detection and reset signal generation circuitry. Known methods for detecting power supply loss includes monitoring a memory cell or a resistor/capacitor (RC) network. These methods require additional capacitors, resistors, and a memory cell (e.g., DRAM, J-K flip flop) to implement, thus increasing the board surface area and resultingly, the cost of the system.

The present invention is directed to overcoming, or at least reducing the effects of, one or more of the problems set forth above by providing a novel and nonobvious method and apparatus for detecting the loss of power supply voltage.

SUMMARY OF THE INVENTION

An aspect of the invention is seen in a microprocessor system including a microprocessor and a first controller. The first controller is coupled to the microprocessor, and the first controller includes a first memory adapted to store a power loss indicator.

Another aspect of the invention is seen in a method for detecting a reduction of a power supply voltage in a microprocessor system. The method includes coupling the power supply voltage to a first memory of a controller. A power loss indicator is stored in the first memory. The occurrence of a predetermined event is detected, and the first memory is read in response to the predetermined event to determine if the power loss indicator is intact.

BRIEF DESCRIPTION OF THE DRAWINGS

Other objects and advantages of the invention will become apparent upon reading the following detailed description and upon reference to the drawings in which.

Figure 1:
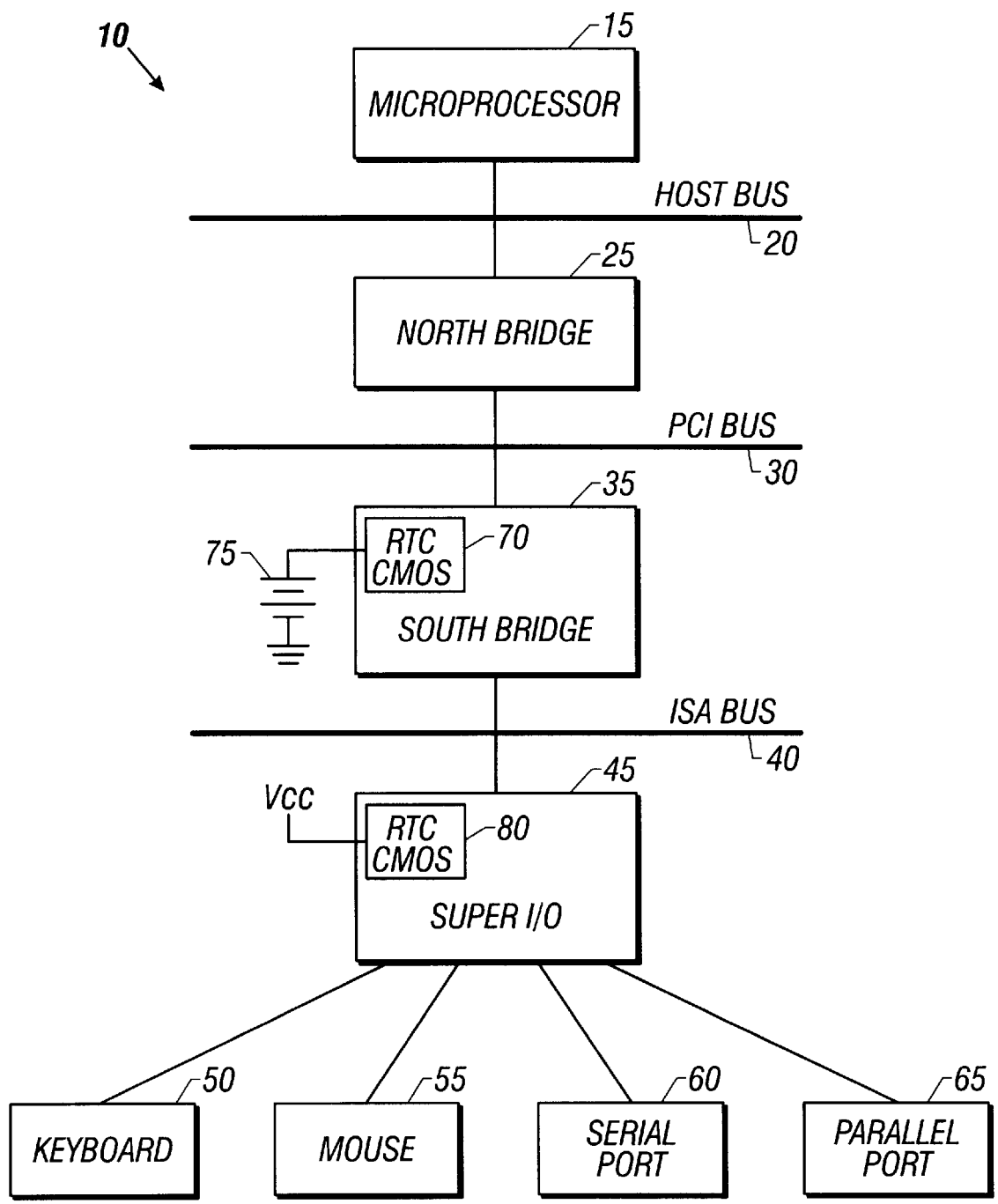
FIG. 1 illustrates a block diagram of a microprocessor system of the present invention capable detecting a power loss condition.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a microprocessor system 10 of the invention is shown. The microprocessor system 10 includes a microprocessor 15 coupled to a host bus 20. A north bridge 25 is coupled to the host bus 20 and a peripheral component interface (PCI) bus 30. A south bridge 35 is coupled to the PCI bus 30 and an industry standard architecture (ISA) bus 40. An input/output (I/O) controller 45 is coupled to the ISA bus 40. Peripherals, such as a keyboard 50, a mouse 55, a serial port 60, and a parallel port 65 are coupled to the I/O controller 45. Not all components or busses contained within a computer system are shown. Some typical components are shown in FIG. 1 for illustrative purposes.

The north bridge 25, sometimes referred to as a host bridge, typically functions as a memory (not shown) controller and cache (not shown) controller and allows the microprocessor 15 to communicate to the other connected busses 30, 40 and components 50, 55, 60, 65. An exemplary north bridge 25 is an 82439TX System Controller (MTXC) offered by Intel Corporation of Santa Clara, Calif.

In the illustrated embodiment, the south bridge 35 connects the PCI bus 30 to the ISA bus 40. In an actual implementation, the south bridge 35 may couple the PCI bus 30 to an integrated drive electronics (IDE) bus (not shown), a universal serial bus (USB) (not shown), or the like. An exemplary south bridge 35 is an 82371AB PCI-to-ISA/IDE Xcelerator (PIIX4) bridge offered by Intel Corporation of Santa Clara, Calif.

The I/O controller 45 allows communication between the peripheral components 50, 55, 60, 65 and the other components in the microprocessor system 10. In the illustrated embodiment, the I/O controller 45 is a Super I/O controller, such as a PC87307VUL offered by National Semiconductor, Inc. of Santa Clara, Calif.

The north bridge 25, the south bridge 35, and the I/O controller 45 illustrated in FIG. 1 are provided as an example implementation. Other bus configurations and specific bus types are contemplated.

The south bridge 35 includes a real time clock complimentary metal oxide silicon (RTC CMOS) memory 70, which is powered by a battery 75. The CMOS 70 stores setup information used by the basic input output system (BIOS) (not shown) of the microprocessor system 10 during the boot process. The BIOS is generally a set of program instructions executed by the microprocessor 15. The CMOS 70 typically maintains the system time-of-day clock (not shown) and stores information such as the amount of system memory (not shown), the hard drive (not shown) type, floppy drive (not shown) type, microprocessor 15 type and speed, power management parameters, and numerous other setup parameters. The battery 75 prevents the setup information from being erased if power is removed from the microprocessor system 10.

In the illustrated embodiment, the I/O controller 45 also includes a RTC CMOS 80. In a typical system, because the setup information for the microprocessor system 10 is stored in the CMOS 70 in the south bridge 35, the CMOS 80 in the I/O controller 45 is unused. In the illustrated embodiment, the CMOS 80 is coupled to a power supply voltage, Vcc. Accordingly, the contents of the CMOS 80 are affected by a change in the power supply voltage, Vcc.

The CMOS 80 is used to store a bit pattern (e.g., a string of 10 bytes set to a value of 55 hexadecimal) initialized by the BIOS during the boot process. If at some time after the bit pattern is set in the CMOS 80, power is lost or a brownout occurs, the contents of the CMOS 80 will be erased or set to some random pattern, depending on the nature of the power loss. In either case, the bit pattern will not be the same as was stored by the BIOS. The voltage loss will cause the microprocessor system 10 to reset. When the microprocessor system 10 is reinitialized, the BIOS will detect the change in the bit pattern stored in the CMOS 80 to identify the power loss condition.

In the illustrated embodiment, setup information for the microprocessor system 10 is stored in the CMOS 70 in the south bridge 35, and the power loss bytes are stored in the CMOS 80 in the I/O controller 45. It is contemplated that the respective storage location may be reversed, with the battery 75 being coupled to the CMOS 80 in the I/O controller 45, and the power supply voltage, Vcc, being coupled to the CMOS 70 in the south bridge 35.

Figure 2:
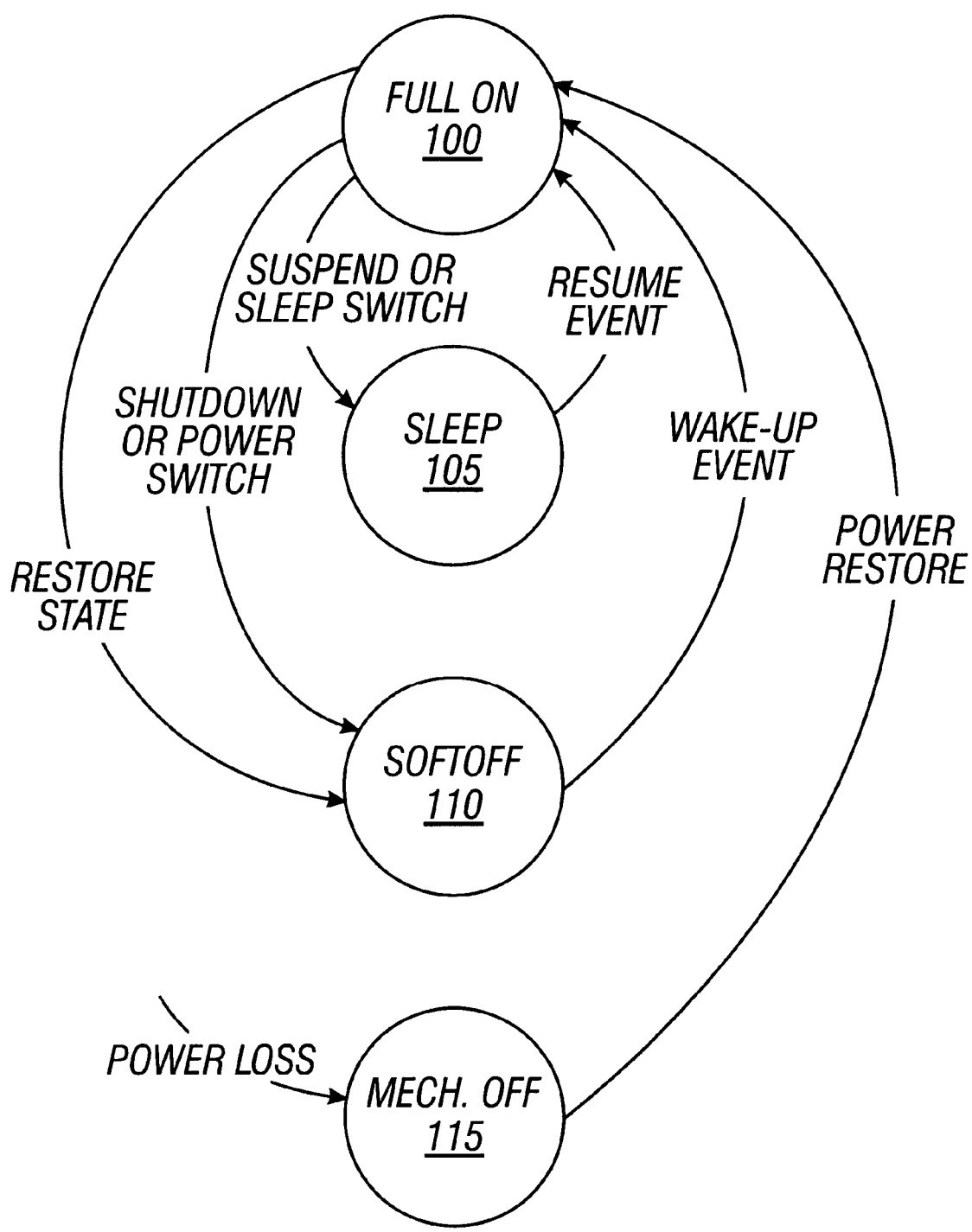
FIG. 2 illustrates a state diagram of the operating modes of the microprocessor system of FIG. 1.

The operating states of the microprocessor system 10 are illustrated in FIG. 2. The four states are the full on state 100, the sleep state 105, the softoff state 110, and the mechanical off state 115.

In the full on state 100, all components in the microprocessor system 10 have power and are operating. The microprocessor system 10 may transition from the full on state 100 to the sleep state 105 in response to an external sleep button (not shown) being pressed, or in response to a predetermined suspend event (e.g., after the microprocessor system 10 has been idle for a specified time interval). The microprocessor system 10 may transition from the full on state 100 to the softoff state 110 in response to an external power button (not shown) being pressed, a software shutdown, etc.

In the sleep state 105, power is removed from certain components, such as the monitor (not shown) or the hard drive (not shown), to conserve power. The microprocessor system 10 may exit from the sleep state 105 in response to the external sleep button being pressed, or in response to a resume event, such as a key being pressed on the keyboard 50 or the mouse 55 being moved.

In the softoff state 110, most components are without power. Certain components may receive a small amount of power to maintain a minimum level of functionality. For example, the south bridge 35 receives a small amount of power to maintain the CMOS 70 so that the battery 75 is not discharged. Other components require power to detect a "wake-up" event that causes the microprocessor system 10 to transition from the softoff state 110 to the full on state 100. Some examples of "wake-up" events are a user pressing the external power button (not shown), a ring being detected on a modem (not shown) coupled to the serial port 60, a signal being detected from a local area network to a network port (not shown), and a power management enable signal being detected on the PCI bus 30. "Wake-up" events may be enabled or disabled based on setup information stored in the CMOS 70.

The microprocessor system 10 is in the mechanical off state 115 if all external power has been removed from the microprocessor system 10 (e.g., by unplugging the power cord).

When the microprocessor system 10 transitions from either the mechanical off state 115 or the softoff state 110, the BIOS executes a startup routine that initializes the microprocessor system 10 and detects if a previous power loss has occurred (i.e., the bit pattern in the CMOS 80 is corrupted). The CMOS 70 includes setup information that specifies what action should be taken in the event of an identified power loss.

Some examples of power loss recovery options are "Power On," "Stay Off," and "Last State." The "Power On" option allows the microprocessor system 10 to boot the operating system and go to the full on state 100 when the power is restored. The "Stay Off" option causes the microprocessor system 10 to go to the softoff state 110 when the power is restored. The system waits in this state until a "wake-up" event occurs. Each of these wake-up events can be disabled in the CMOS 70 Setup. The "Last State" option will return the microprocessor system 10 to the state that it was in prior to the power loss. In the case where the system was in the full on state 100 when power was removed from the system and subsequently restored, the system will power on, boot to the operating system, and return to the full on state 100. However, if the microprocessor system 10 was in the softoff state 110 when power was lost and restored, the system would return to the softoff state 110.

Figure 3:
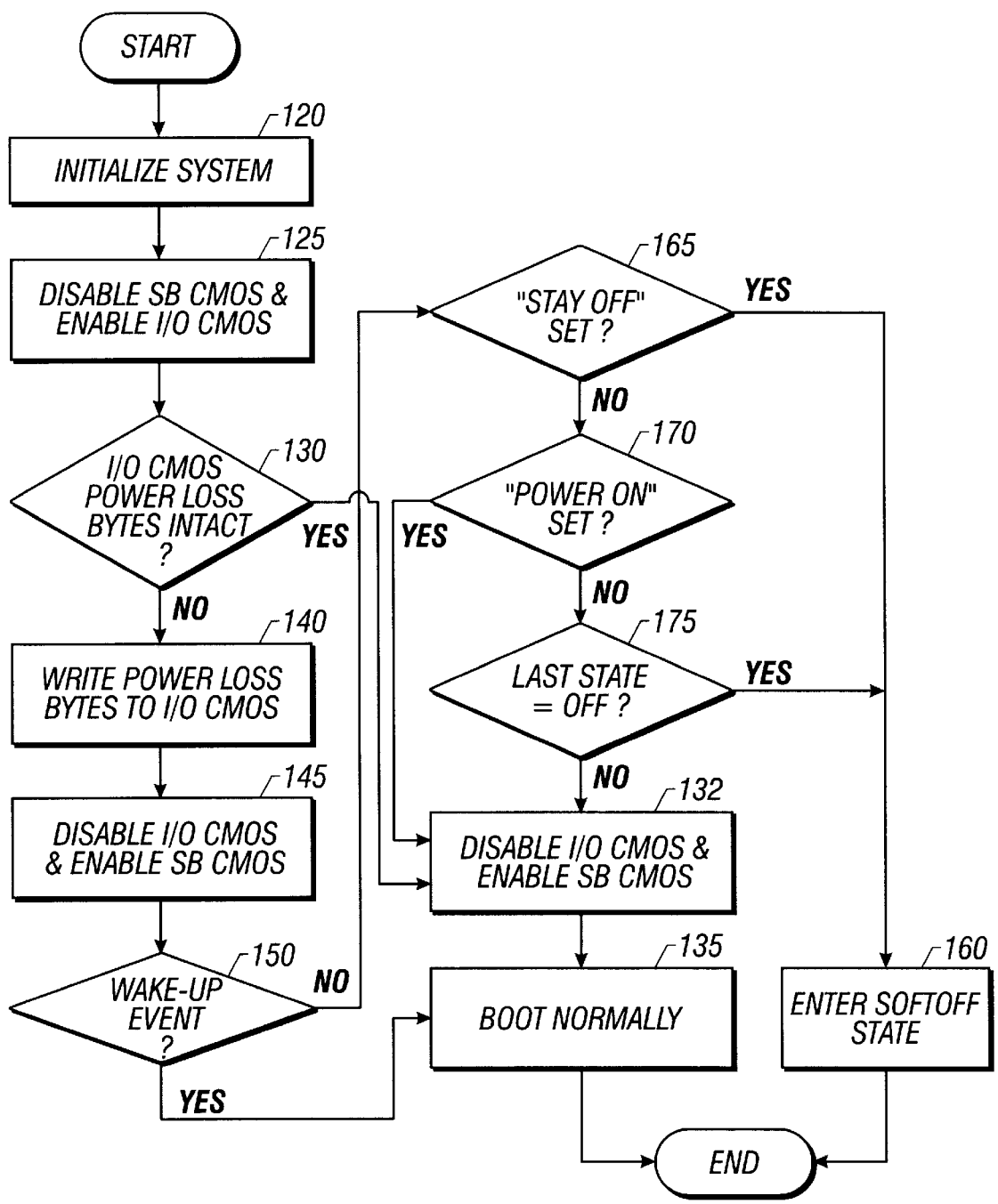
FIG. 3 illustrates a flow diagram of a boot process and power loss monitoring method for the microprocessor system of FIG. 1.

A flow diagram of the boot process used by the BIOS during startup of the microprocessor system 10 is shown in FIG. 3. As stated above, the BIOS begins executing the method when a transition from the mechanical off state 115 or the softoff state 110 occurs. For ease of illustration in FIG. 3, the CMOS 70 in the south bridge 35 is referred to as the "SB CMOS" and the CMOS 80 in the I/O controller 45 is referred to as the "IO CMOS"

The microprocessor system 10 is initialized in block 120 to place the components in a known configuration. The SB CMOS 70 is disabled, and the IO CMOS 80 is enabled in block 125. The power loss bytes are checked in block 130 to determine if a power loss has occurred. If a power loss is the reason for the reset, the bit pattern will be different from what had been set by the BIOS during the previous boot. If the power loss bytes are intact, then the microprocessor 15 disables the IO CMOS 80 and enables the SB CMOS 70 in block 132, so the BIOS can proceed with the boot using the setup information stored therein. The BIOS then proceeds with a normal boot in block 135.

If the power loss bytes are not intact, the microprocessor 15 writes the predetermined bit pattern of the power loss bytes into the IO CMOS 80 in block 140. Then, the IO CMOS 80 is disabled, and the SB CMOS 70 is enabled in block 145. The BIOS determines if the reboot was triggered by a "wake-up" event in block 150 and boots normally in block 135 if so determined.

In blocks 165 and 170, the SB CMOS 70 is checked to determine which recovery option has been selected. If the "Stay Off" option is selected in block 165, the microprocessor system 10 transitions to the softoff state 110 in block 160. If the "Power On" option is selected in block 170, the microprocessor 15 disables the IO CMOS 80 and enables the SB CMOS 70 in block 132 and boots normally in block 135. If the "Power On" option is not selected, the last state of the microprocessor system 10 will be checked in block 175, and if the last state was either the softoff state 110 or the mechanically off state 115, the microprocessor system 110 will enter the softoff state in block 160. Otherwise, the microprocessor 15 will disable the IO CMOS 80 and enable the SB CMOS 70 in block 132 and proceed with a normal boot in block 135.

The invention has been described above in the context of determining that a power loss had occurred during a subsequent reboot of the microprocessor system 10. The invention as disclosed herein has other applications, depending on the specific voltage source tied to the CMOS 80. For example, the CMOS 80 could be tied to a voltage from a specific component to detect transients affecting that particular component. In the embodiment described above, the CMOS 80 is checked during the boot process of FIG. 3. Alternatively, the BIOS, another device, or a software application may be programmed to check the power loss bytes in the CMOS 80 at a specific time, a periodic time interval, or in response to a predetermined event. Also, the power loss bytes may be monitored periodically, to preemptively assert a reset signal before a power loss affects other components in the system. These and other alternative uses for the power loss bytes in the CMOS 80 are evident in light of the disclosure herein.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A microprocessor system, comprising:
    (a) a microprocessor; and
    (b) a first controller coupled to the microprocessor, the first controller including a first memory, wherein (i) the contents of the first memory are set to a specified value prior to a power interruption, and (ii) the microprocessor is adapted to read the memory and to determine if power has been interrupted by determining whether the contents of the memory are equal to the specified value.

2. The microprocessor system of claim 1, further comprising a power supply adapted to provide a power supply voltage, wherein the power supply voltage is coupled to the first memory.

3. The microprocessor system of claim 1, wherein the first memory comprises a complimentary metal oxide silicon memory.

4. The microprocessor system of claim 1, wherein the microprocessor is adapted to store the specified value in the first memory during an initialization of the microprocessor system.

5. The microprocessor system of claim 1, further comprising:
    (c) a second controller coupled to the microprocessor, the second controller including a second memory adapted to store setup information related to the microprocessor system; and
    (d) a battery coupled to the second memory.

6. The microprocessor system of claim 5, wherein at least one of the first controller and the second controller comprises a bridge controller.

7. The microprocessor system of claim 5, wherein at least one of the first controller and the second controller comprises an input/output controller.

8. The microprocessor system of claim 1, wherein the microprocessor is adapted (i) to operate the microprocessor system in an off mode, and (ii) to read the memory and to determine whether the contents of the memory are equal to the specified value when exiting from the off mode.

9. The microprocessor system of claim 8, wherein the off mode comprises at least one of a softoff mode and a mechanical off mode.

10. The microprocessor system of claim 8, wherein the microprocessor is further adapted (i) to operate the microprocessor system in a full on mode, and (ii) to transition from the off mode to one of the full on mode and the off mode depending on the contents of the first memory.

11. The microprocessor system of claim 10, further comprising a second controller coupled to the microprocessor, the second controller including a second memory adapted to store setup information related to the microprocessor system, wherein the setup information includes a power interruption recovery option, and the microprocessor is adapted to transition from the off mode to one of the full on mode and the off mode depending on the contents of the first memory and the power interruption recovery option.

12. A method for detecting a specified reduction of a power supply voltage in a microprocessor system, comprising:
    (a) providing a first memory that (i) is operatively coupled to the power supply voltage, and (ii) contains a specified value during normal, powered operation, wherein the specified reduction of the power supply voltage would be expected to result in a different value being contained in the first memory;
    (b) detecting the occurrence of a predetermined event;
    (c) reading the first memory in response to the predetermined event; and
    (d) determining if the contents of the first memory are equal to the specified value.

13. The method of claim 12, wherein the detecting includes detecting a reset of the microprocessor system.

14. The method of claim 12, wherein the detecting includes determining that a specified time interval has elapsed.

15. The method of claim 12, the microprocessor system being adapted to operate in an off mode, wherein the detecting includes determining that the microprocessor system is exiting the off mode.

16. The method of claim 12, further comprising storing setup information related to the microprocessor system in a second memory, the setup information including a power interruption recovery option.

17. The method of claim 16, the microprocessor system being adapted to operate in an off mode and a full on mode, the method further comprising:

(1) determining that the microprocessor system is exiting the off mode; and (2) transitioning to one of the off mode and the full on mode depending on the contents of the first memory and the power interruption recovery option.

18. A microprocessor system, comprising:

(a) a microprocessor;

(b) a first controller coupled to the microprocessor, the first controller including a first memory, wherein (i) the contents of the first memory are set to a specified value prior to a power interruption, and (ii) the microprocessor is adapted to read the first memory to determine if power has been interrupted;

(c) a power supply adapted to provide a power supply voltage, wherein the power supply voltage is coupled to the first memory;

(d) a second controller coupled to the microprocessor, the second controller including a second memory adapted to store setup information related to the microprocessor system; and (e) a battery coupled to the second memory.

19. A method, executed by a microprocessor, for detecting the occurrence of a power interruption, comprising:

(a) storing a specified value in a memory prior to the power interruption;

(b) determining whether the contents of the memory are equal to the specified value, and if not, then executing a power-interruption response.

20. A program storage device encoding instructions, executable by the microprocessor of a specified one of claims 12 through 19, to perform the operations recited in the specified claim.

* * * * *